United States Patent
Han et al.

(10) Patent No.: US 9,266,043 B2
(45) Date of Patent: Feb. 23, 2016

(54) FILTER CARTRIDGE

(75) Inventors: Doo-Won Han, Seoul (KR); Dae-Hwan Kim, Seoul (KR); Sang-Hyeon Kang, Seoul (KR)

(73) Assignee: COWAY CO., LTD (KR)

( * ) Notice: Subject to any disclaimer, the term of this patent is extended or adjusted under 35 U.S.C. 154(b) by 253 days.

(21) Appl. No.: 13/821,064

(22) PCT Filed: Sep. 7, 2011

(86) PCT No.: PCT/KR2011/006595
§ 371 (c)(1),
(2), (4) Date: Apr. 18, 2013

(87) PCT Pub. No.: WO2012/033331
PCT Pub. Date: Mar. 15, 2012

(65) Prior Publication Data
US 2013/0213878 A1     Aug. 22, 2013

(30) Foreign Application Priority Data
Sep. 7, 2010     (KR) ........................ 10-2010-0087293

(51) Int. Cl.
*B01D 63/14*     (2006.01)
*B01D 27/14*     (2006.01)
(Continued)

(52) U.S. Cl.
CPC ............ *B01D 27/144* (2013.01); *B01D 29/111* (2013.01); *B01D 29/21* (2013.01);
(Continued)

(58) Field of Classification Search
CPC ...... B01D 29/111; B01D 29/21; B01D 29/58; B01D 63/14; B01D 63/067; B01D 27/44; B01D 2201/12; B01D 2201/122; B01D 2201/125; B01D 2201/127; B01D 29/07; B01D 29/055; B01D 29/072; B01D 29/059; B01D 46/52; B01D 46/526; B01D 46/527; B01D 27/148; B01D 27/06; B01D 27/07; F02M 35/024; F02M 35/02458; F02M 35/0245; F02M 35/02408; F02M 35/02416; F02M 35/02483; F02M 35/0214
USPC ......... 210/321.77, 321.86, 487, 493.1, 493.2, 210/493.5, 493.3, 488, 489, 494.1; 156/218, 228
See application file for complete search history.

(56) References Cited

U.S. PATENT DOCUMENTS 4,184,966 A * 1/1980 Pall ............................ 210/493.2
5,114,508 A * 5/1992 Miyagi et al. ................... 156/69
(Continued)

FOREIGN PATENT DOCUMENTS

CN          1777465          5/2006
CN         101087638        12/2007
(Continued)

OTHER PUBLICATIONS

International Search Report—PCT/KR2011/006595 dated Apr. 16, 2012.

*Primary Examiner* — David C Mellon
*Assistant Examiner* — Pranav Patel
(74) *Attorney, Agent, or Firm* — Cantor Colburn LLP

(57) ABSTRACT

Disclosed is a filter cartridge. The filter cartridge includes an inner filter in the form of an approximately cylindrical corrugated membrane, an outer filter in the form of an approximately cylindrical corrugated membrane, the outer filter having a diameter greater than that of the inner filter and being installed around the inner filter, and at least one holder to support the inner filter and the outer filter.

5 Claims, 6 Drawing Sheets

(51) Int. Cl.
*B01D 29/11* (2006.01)
*B01D 29/21* (2006.01)
*B01D 29/58* (2006.01)
*B01D 27/06* (2006.01)
*B01D 29/07* (2006.01)
*B01D 63/06* (2006.01)
*B82Y 30/00* (2011.01)

(52) U.S. Cl.
CPC ............ *B01D 29/58* (2013.01); *B01D 27/06* (2013.01); *B01D 27/148* (2013.01); *B01D 29/07* (2013.01); *B01D 63/067* (2013.01); *B01D 63/14* (2013.01); *B01D 2201/12* (2013.01); *B82Y 30/00* (2013.01)

(56) References Cited

U.S. PATENT DOCUMENTS

| | | | | |
|---|---|---|---|---|
| 5,185,190 A | * | 2/1993 | Grimes | 428/36.91 |
| 5,198,107 A | * | 3/1993 | Ponce | 210/232 |
| 5,232,595 A | * | 8/1993 | Meyer | 210/493.1 |
| 5,622,624 A | * | 4/1997 | Lauer et al. | 210/232 |
| 5,762,796 A | * | 6/1998 | Zraik | 210/493.1 |
| 6,230,777 B1 | * | 5/2001 | Hedlund et al. | 156/443 |
| 6,949,155 B1 | * | 9/2005 | Lang et al. | 156/73.1 |
| 7,462,282 B2 | * | 12/2008 | Mees et al. | 210/493.1 |
| 7,473,362 B1 | * | 1/2009 | Nohren, Jr. | 210/321.64 |
| 2004/0206682 A1 | | 10/2004 | Hamlin et al. | |
| 2006/0108277 A1 | | 5/2006 | Fall et al. | |
| 2008/0011662 A1 | | 1/2008 | Milosavljevic et al. | |
| 2008/0245719 A1 | * | 10/2008 | Beard et al. | 210/235 |
| 2008/0245726 A1 | * | 10/2008 | Senetar | 210/487 |
| 2008/0302717 A1 | | 12/2008 | Terry et al. | |
| 2010/0115899 A1 | | 5/2010 | Lee et al. | |

FOREIGN PATENT DOCUMENTS

| | | |
|---|---|---|
| JP | 08056527 | 3/1996 |
| JP | 3057041 | 12/1998 |
| KR | 1020020027816 | 4/2002 |
| KR | 1020070098289 | 10/2007 |
| WO | 2008124199 | 10/2008 |

* cited by examiner

FILTER CARTRIDGE

TECHNICAL FIELD

The present invention relates to a filter cartridge, and more particularly, to a filter cartridge in which two layers of filters are mounted, resulting in enhanced filtering capability.

BACKGROUND ART

Filters for use in water purifiers or water treatment equipment serve to filter off impurities contained in water or other liquid passing therethrough, thereby extracting only pure water or liquid.

When repeatedly carrying out the above described filtering operation, impurities are continuously adhered to and accumulated on the surface of a filter, or slight damage to the filter occurs, which causes deterioration in the capability of the filter as time passes. For this reason, periodically replacing the filter is essential to maintain uniform water purification or water treatment quality.

To this end, standardized filter cartridges have been developed. Such a filter cartridge in which a filter is accommodated is coupled to a filter holder when in use and then, after the lifespan of the filter terminates, the filter cartridge is separated from the filter holder so as to be replaced with a new filter cartridge in a simplified manner.

FIGS. 5 and 6 illustrate a known conventional filter cartridge, in which a multiply folded membrane filter 3 is interposed between disc-shaped holders 2 and a core 4 is centered in the membrane filter 3.

In the above described conventional filter cartridge, to increase a treatment capacity per hour, the membrane filter 3 has a multiply folded shape suitable to achieve an increased surface area.

As illustrated in FIG. 6, the membrane filter 3 of the conventional filter cartridge is fabricated by folding a flat planar membrane multiple times in zigzag and then, bonding both ends of the membrane to each other. In this case, a resulting bonded portion 5 is oriented such that a tip thereof faces outward of the filter cartridge.

In operation of the conventional filter cartridge having the above described configuration, raw water, which has been introduced into the filter cartridge through a water inlet hole 9, is filtered by the filter 3 while moving through the core 4, whereby purified water is discharged from the filter cartridge.

In this case, while passing through the filter 3, some of the raw water must pass through the bonded portion 5 as well as the surface of the filter. However, the bonded portion 5 may be contaminated with fine dust particles or impurities that have been generated during manufacture of the filter cartridge, which causes the impurities to be unintentionally contained in the purified water to be transmitted to a user.

In addition, since only one filter 3 is used to purify water, water purifying capability may not be sufficient.

DISCLOSURE OF INVENTION

Technical Problem

Therefore, the present invention has been made in view of the above problems of the prior art, and it is an object of the present invention to provide a filter cartridge, which can enhance water purifying capability and prevent purified water from being contaminated with fine dust particles generated during manufacture of a filter.

Solution to Problem

In accordance with an aspect of the present invention, the above and other objects can be accomplished by the provision of a filter cartridge including an inner filter in the form of an approximately cylindrical corrugated membrane, an outer filter in the form of an approximately cylindrical corrugated membrane, wherein the outer filter has a diameter greater than that of the inner filter and is installed around the inner filter, and at least one holder to support the inner filter and the outer filter.

Both ends of each of the inner filter and the outer filter in the form of a corrugated membrane may be bonded to each other to provide the filer the filter with an approximately cylindrical shape.

The at least one holder may have a disc shape and includes a first holder and a second holder arranged to correspond to both ends of the inner filter and the outer filter in a one to one ratio.

The first holder may have a central water inlet hole, into which water can be supplied from the outside.

An inner bonded portion of the inner filter may be oriented to face the outer filter, and an outer bonded portion of the outer filter may be oriented to face the inner filter, whereby fine dust particles generated at the bonded portions are confined between the outer filter and the inner filter.

In accordance with another aspect of the present invention, there is provided a filter cartridge including an inner filter in the form of an approximately cylindrical corrugated membrane, both ends of which are bonded to each other, an outer filter in the form of an approximately cylindrical corrugated membrane, both ends of which are bonded to each other, wherein the outer filter has a diameter greater than that of the inner filter and is installed around the inner filter, and a first holder and a second holder arranged to correspond to both ends of the inner filter and the outer filter in a one to one ratio so as to support the inner filter and the outer filter, the first holder and the second holder having a disc shape, wherein the first holder has a central water inlet hole into which water can be supplied from the outside, wherein an inner bonded portion of the inner filter is oriented to face the outer filter, and wherein an outer bonded portion of the outer filter is oriented to face the inner filter.

The filter cartridge may further include a core, one end of which is secured to the first holder and the other end of which is secured to the second holder, the core having a hollow cylindrical interior space such that the water introduced through the water inlet hole can be supplied to the filter, and a water passage hole being perforated in a peripheral surface of the core.

The inner filter and the outer filter may be formed of nano alumina fiber as a main material.

Advantageous Effects of Invention

With the above described filter cartridge in accordance with the present invention, the filter cartridge can achieve enhanced purification capability owing to a dual filter configuration including an inner filter and an outer filter. Moreover, as fine dust particles that may be generated at bonded portions of the filter during manufacture can be confined between the inner filter and the outer filter, clean water not mixed with impurities can be provided.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Hereinafter, a preferred embodiment of a filter cartridge in accordance with the present invention will be described in detail with reference to the accompanying drawings.

Figure 1:
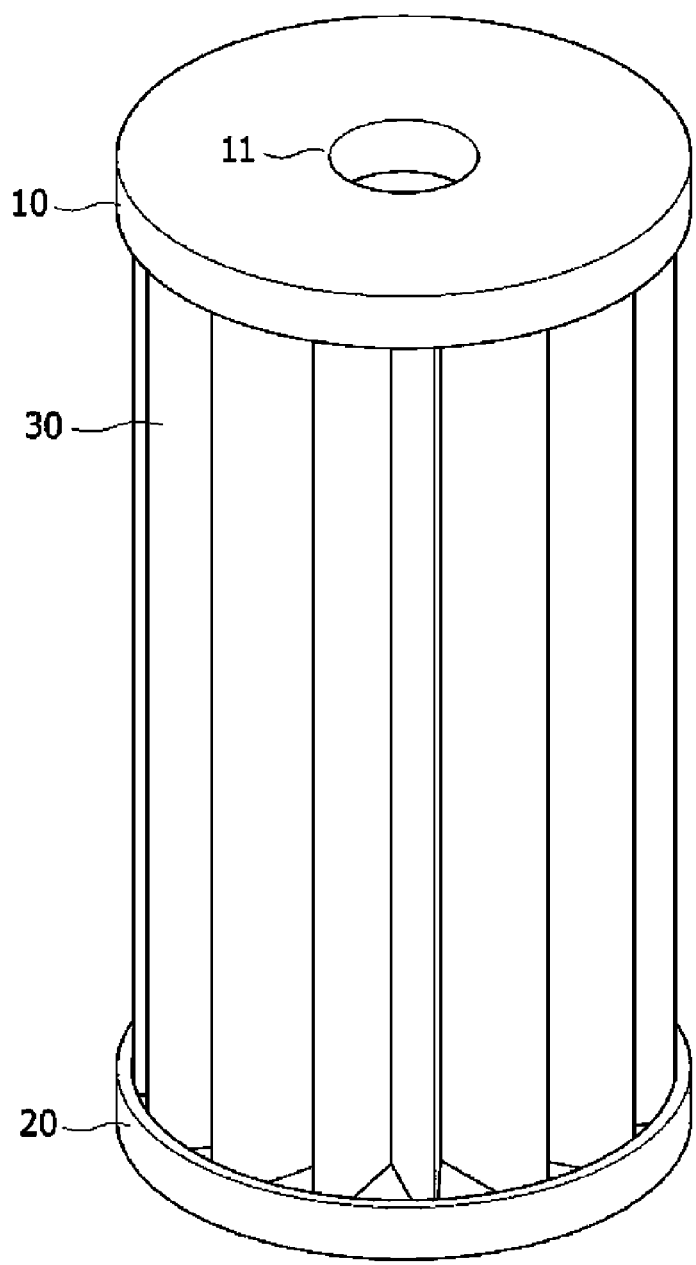
FIG. 1 is a perspective view illustrating a filter cartridge in accordance with the present invention.
Figure 2:
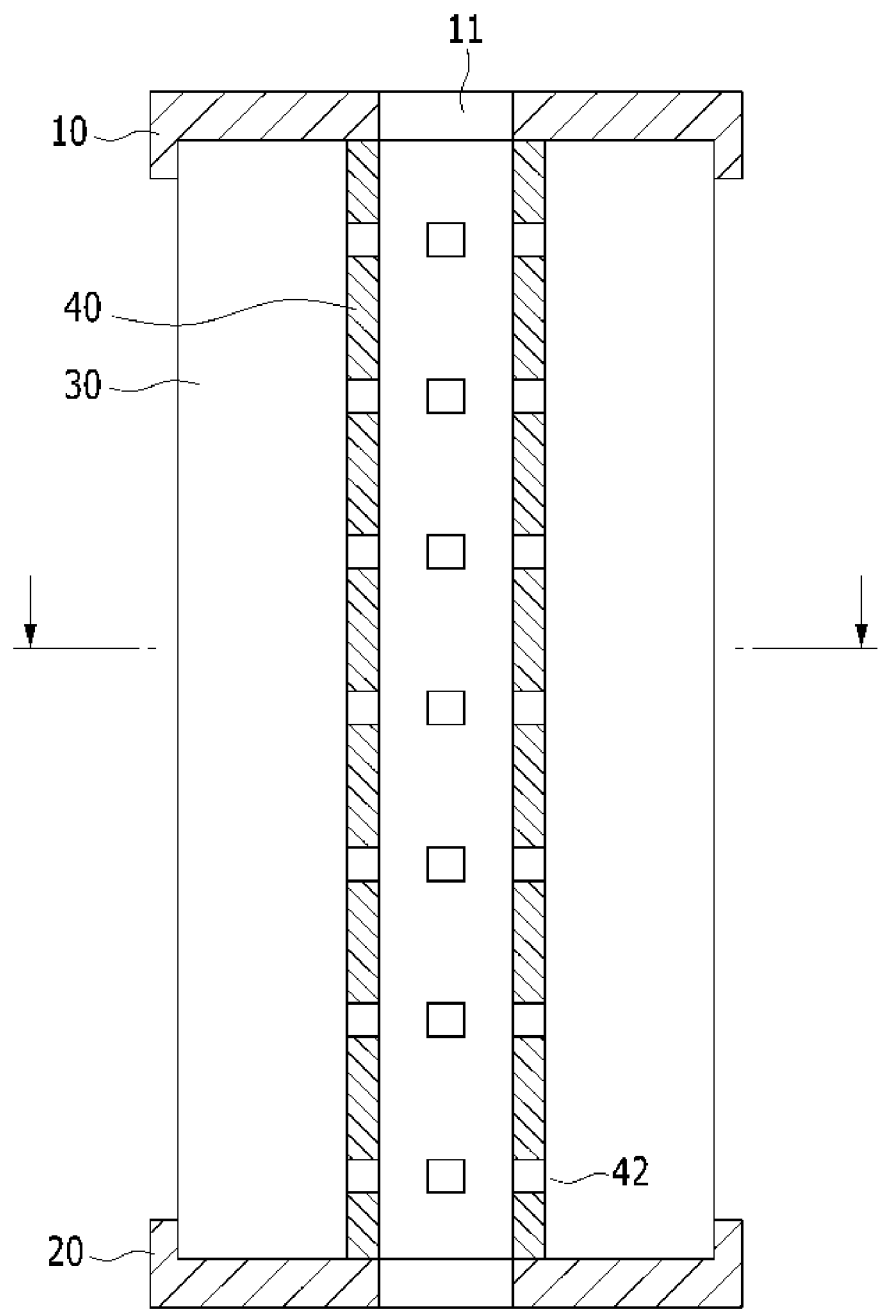
FIG. 2 is a longitudinal sectional view illustrating the filter cartridge in accordance with the present invention.

FIG. 1 is a perspective view illustrating a filter cartridge in accordance with the present invention, and FIG. 2 is a longitudinal sectional view illustrating the filter cartridge in accordance with the present invention. As illustrated in FIGS. 1 and 2, the filter cartridge includes an upper first holder 10 and a lower second holder 20.

The first holder 10 and the second holder 20 have a disc shape. The first holder 10 is centrally provided with a water inlet hole 11, through which water can be introduced into the filter cartridge from the outside.

A core 40 and a filter 30 are arranged between the first holder 10 and the second holder 20. Here, the core 40 serves as a support rod. An upper end of the core 40 is secured to a lower surface of the first holder 10 and a lower end of the core 40 is secured to an upper surface of the second holder 20. The core 40 has a hollow cylindrical shape and is perforated in a peripheral surface thereof with a plurality of water passage holes 42.

The hollow interior of the core 40 is communicated with the water inlet hole 11 of the first holder 10 so that raw water having passed through the water inlet hole 11 is introduced into the hollow interior of the core 40. The water introduced into the core 40 can be discharged to the outside of the core 40 through the water passage holes 42.

The filter 30 is placed outside the core 40. That is, the filter 30 is placed to surround the outer periphery of the core 40, which allows the raw water introduced into the core 40 to be filtered off by passing through the filter 30.

Figure 3:
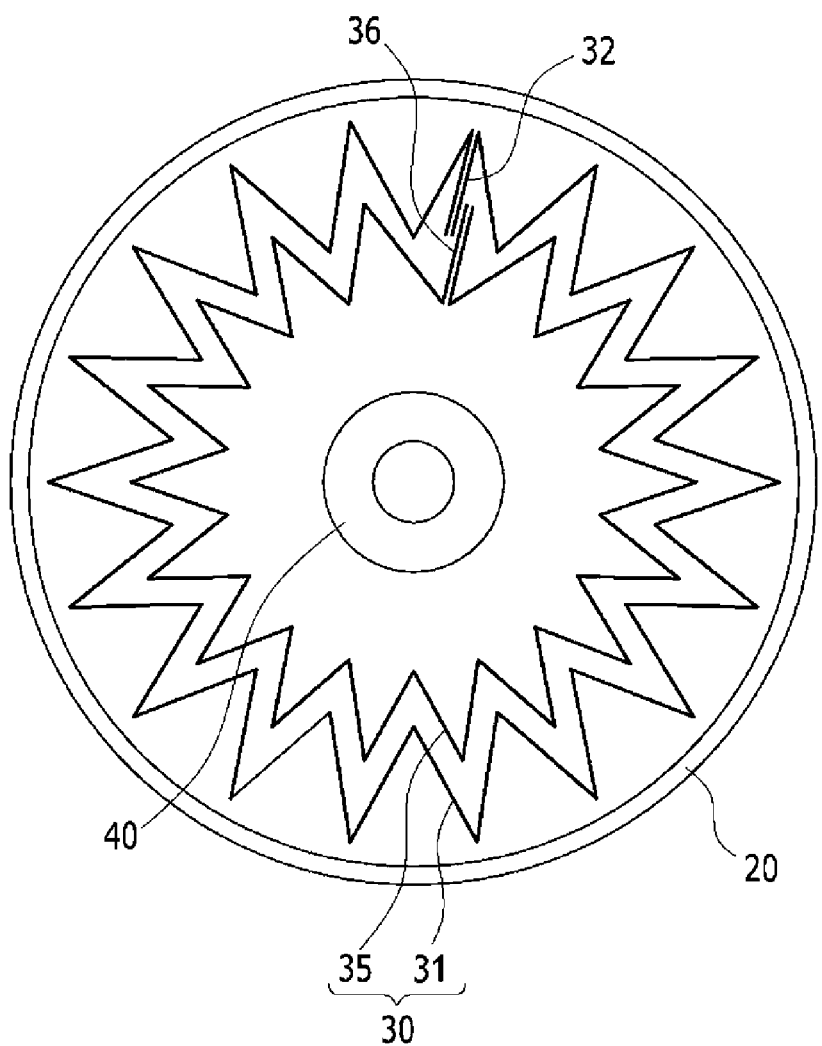
FIG. 3 is a transversal sectional view illustrating the filter cartridge in accordance with the present invention.
Figure 4:
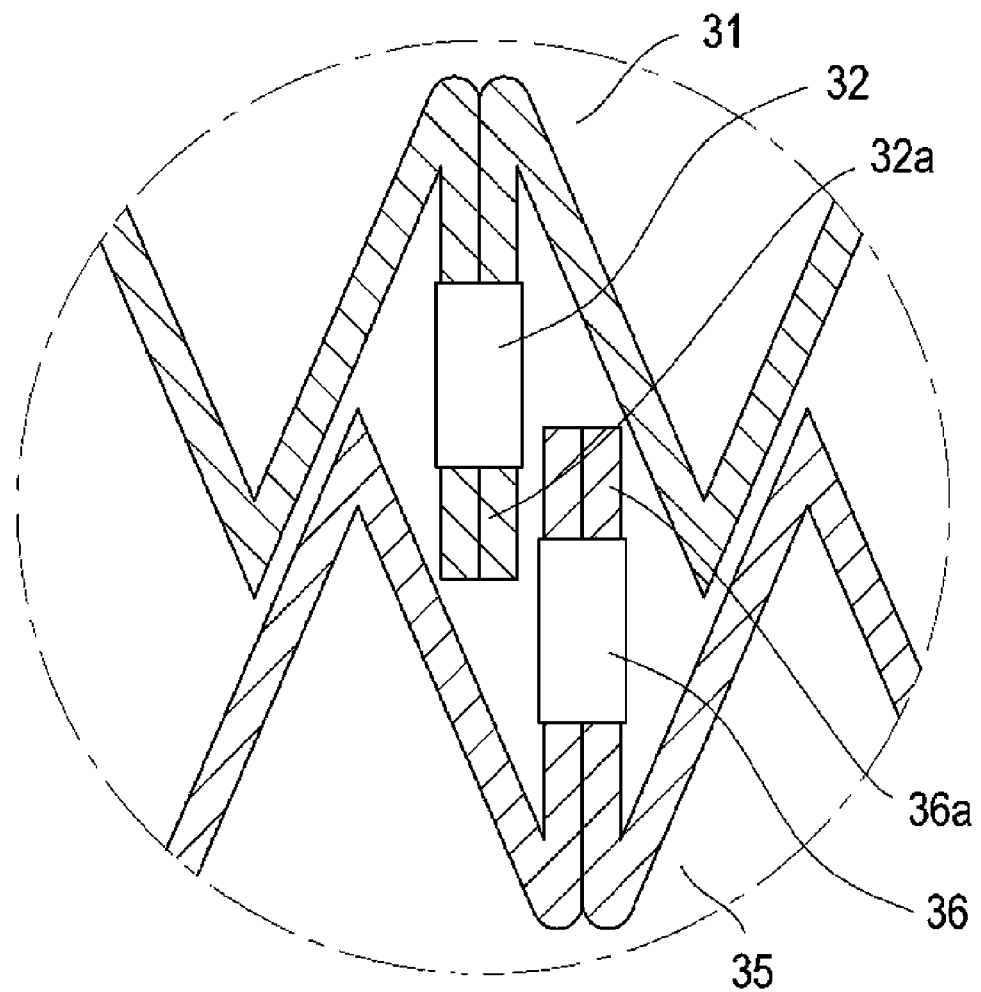
FIG. 4 is an enlarged sectional view illustrating a bonded portion of the filter cartridge in accordance with the present invention.
Figure 5:
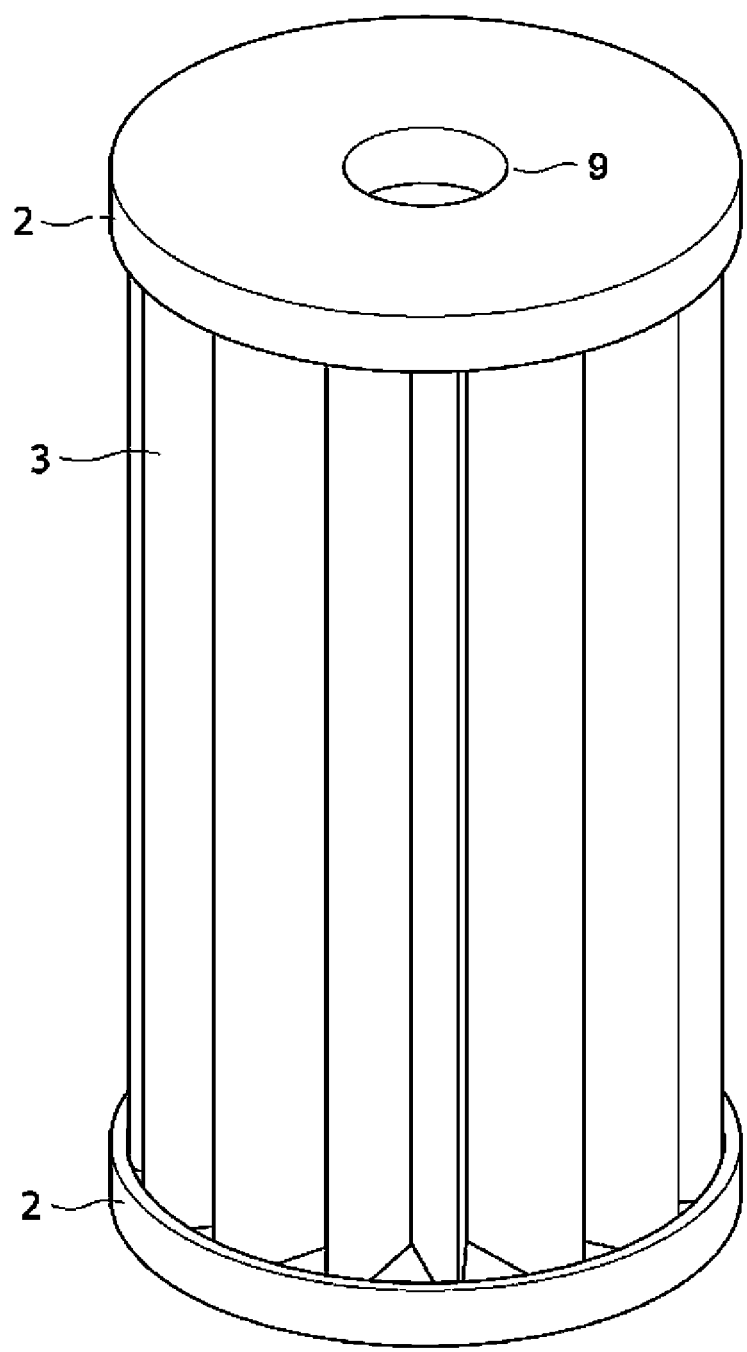
FIG. 5 is a perspective view illustrating a conventional filter cartridge.
Figure 6:
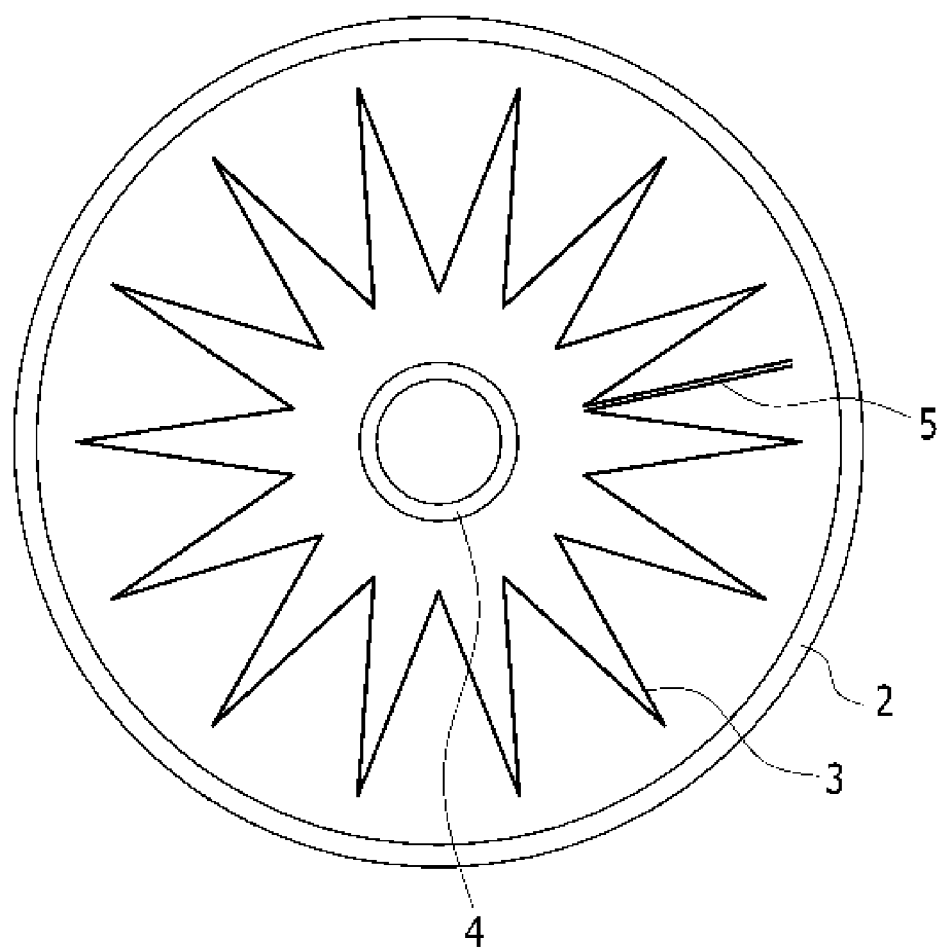
FIG. 6 is a transversal sectional view illustrating the conventional filter cartridge.

FIG. 3 is a transversal sectional view illustrating the filter cartridge in accordance with the present invention, and FIG. 4 is an enlarged sectional view illustrating a bonded portion of the filter cartridge in accordance with the present invention.

As illustrated in FIGS. 3 and 4, the filter 30 of the filter cartridge in accordance with the present invention consists of an outer filter 31 and an inner filter 35. The inner filter 35 is arranged adjacent to the core 40 and the outer filter 31 is installed outside the inner filter 35.

The outer filter 31 and the inner filter 35 take the form of a corrugated filter multiply folded in zigzag and have an approximately cylindrical shape. The raw water, which has passed through the water inlet hole 11 and the water passage holes 42 of the core 40, is primarily filtered off by passing through the inner filter 35 and then, is secondarily filtered off by passing through the outer filter 31. Through such double water filtering, clean water from which bacteria and impurities have been removed by almost 100% can be finally discharged to the outside.

The filter 30 is advantageously formed of a nano trap filter material.

A nano trap filter is mainly formed of nano alumina (AlOOH) fiber. The nano alumina fiber has a diameter of approximately 2 nm and exhibits significantly high positive electricity. In addition to nano alumina fiber, the nano trap filter is formed of cellulose, polyester, glass fiber, organic adhesive and the like.

The nano trap filter can filter off minerals, organic matter, metal, bacteria, DNA, viruses and the like in a range from micron particles to nano particles.

In addition to the above described outstanding water purification ability, the nano trap filter provides a high flow rate and thus, can advantageously treat a greater quantity of impurities within a short time than conventional filters.

The nano trap filter is fabricated by continuous extraction using a machine in the same manner as fabrication of paper, which can reduce production costs of the filter. More particularly, as illustrated in FIGS. 3 and 4, sheet-shaped planar filter membranes 31 and 35 are folded multiple times and then, both ends thereof are bonded to each other so as to form bonded portions 32 and 36, whereby an approximately cylindrical filter can be obtained.

As described above, the outer filter 31 and the inner filter 35, which are provided in the form of nano trap filters, are fabricated as nano alumina fiber, cellulose, polyester, glass fiber and the like are combined with one another by means of an organic adhesive. Thus, during manufacturing of the filter, i.e. bonding of the filter, tiny dust particles may be generated at the ends 36a and 32a of the bonded portions 32 and 36.

In the filter cartridge in accordance with the present invention, both ends of the outer filter 31 are bonded to form the outer bonded portion 32, and both ends of the inner filter 35 are bonded to form the inner bonded portion 36. The bonded portions 32 and 36 protrude to face each other.

In other words, the inner bonded portion 36 protrudes outward of the filter cartridge, and the outer bonded portion 32 protrudes inward of the filter cartridge.

Fine dust particles are mainly generated at distal ends 32a and 36a of the bonded portions 32 and 36. Thus, when water moves outward through the inner filter 35, the fine dust particles may leak from the distal end 36a of the bonded portion 36 and be mixed with the water passing through the distal end 36a. However, when the water moves inward through the inner filter 35, the fine dust particles cannot pass through the inner filter 35 even if they are mixed with the water. Likewise, when water moves inward through the outer filter 31, the fine dust particles may leak from the distal end 32a of the bonded portion 32 and be mixed with the water passing through the distal end 32a. However, when the water moves move outward through the outer filter 31, the fine dust particles cannot pass through the outer filter 35 even if they are mixed with the water.

In conclusion, the fine dust particles present at the inner bonded portion 36 and the outer bonded portion 32 are confined between the inner filter 35 and the outer filter 31.

Accordingly, in a general case in which raw water introduced through the water inlet hole 11 passes through the filter 30 around the core 40 and in contrast, even in a case in which raw water passes from the outside to the core 40 through the filter 30, since the fine dust particles are confined in a space between the inner filter 35 and the outer filter 31, it is possible to prevent purified water having passed through the filter 30 from being contaminated by the fine dust particles.

Mode for the Invention

Various embodiments have been described in the best mode for carrying out the invention.

INDUSTRIAL APPLICABILITY

As is apparent from the above description, a filter cartridge in accordance with the present invention can achieve enhanced purification capability owing to a dual filter configuration including an inner filter and an outer filter. Further, as a result of orienting an inner bonded portion of the inner filter toward the outer filter and an outer bonded portion of the outer filter toward the inner filter, leakage of fine dust particles from the bonded portions does not occur regardless of a water flow direction, which can ensure discharge of clean water.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A filter cartridge comprising:
an inner filter in the form of an approximately cylindrical corrugated membrane;
an outer filter in the form of an approximately cylindrical corrugated membrane, wherein
the outer filter has a diameter greater than that of the inner filter and is installed around the inner filter to define a space between the inner filter and the outer filter; and
at least one holder to support the inner filter and the outer filter,
wherein both ends of each of the inner filter and the outer filter in the form of a corrugated membrane are bonded to each other so as to be in an approximately cylindrical shape,
wherein a protrusion of the inner filter is disposed within a recess of the outer filter,
wherein an inner bonded portion of the inner filter is oriented to face the outer filter, and an outer bonded portion of the outer filter is oriented to face the inner filter in such a way that the inner bonded portion and the outer bonded portion remain within the space,
wherein at least a part of the inner bonded portion and at least a part of the outer bonded portion are overlapped with each other, and
wherein the inner bonded portion and the outer bonded portion are bonded by an organic adhesive,
whereby fine dust particles generated at the bonded portions when water moves outward through the outer filter or moves inward through the inner filter are confined between the outer filter and the inner filter.

2. The filter cartridge according to claim 1, wherein the at least one holder has a disc shape and includes a first holder and a second holder arranged to correspond to both ends of the inner filter and the outer filter respectively.

3. The filter cartridge according to claim 2, wherein the first holder has a central water inlet hole, into which water can be supplied from the outside.

4. The filter cartridge according to claim 1, wherein the inner filter and the outer filter are formed of nano alumina fiber as a main material.

5. The filter cartridge according to claim 2, further comprising a core, one end of which is secured to the first holder and the other end of which is secured to the second holder, wherein the core has a hollow cylindrical interior space such that the water introduced through the water inlet hole can be supplied to the filter, and wherein a water passage hole is perforated in a peripheral surface of the core.

* * * * *